(No Model.)
C. T. TOMKINS.
STORAGE BATTERY.
No. 279,046. Patented June 5, 1883.
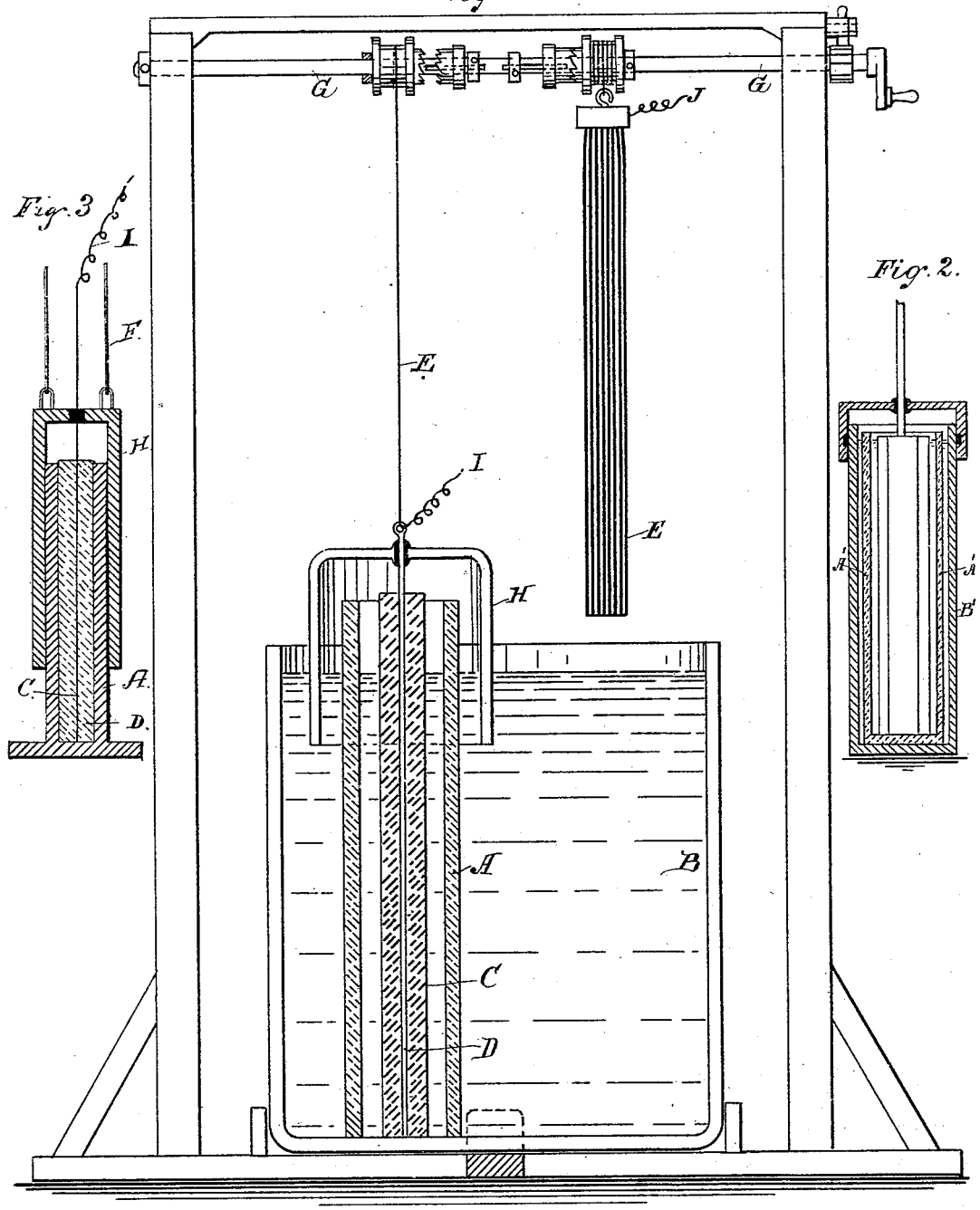
Witnesses.
Inventor.
Cornelius T. Tomkins.
By. Amos Broadnax
Atty.

UNITED STATES PATENT OFFICE.

CORNELIUS T. TOMKINS, OF NEW YORK, N. Y.

STORAGE-BATTERY.

SPECIFICATION forming part of Letters Patent No. 279,046, dated June 5, 1883.

Application filed February 13, 1883. (No model.)

*To all whom it may concern:*

Be it known that I, CORNELIUS T. TOMKINS, a citizen of the United States, residing in the city, county, and State of New York, have invented certain new and useful Improvements in Storage-Batteries, of which the following is a description in such full, clear, concise, and exact terms as will enable any one skilled in the art to which they appertain or with which they are most nearly connected to make and use the same, reference being had to the accompanying drawings, making part of this specification, in which—

Figures 1, 2, and 3 illustrate an apparatus and a device showing the application of my improvement.

It is well known that storage-batteries, after being charged and before being used, gradually lose the electric energy stored in them, some quicker than others; but all of them become inert within a comparatively short time, thus very greatly impairing their usefulness.

My invention consists in discovering a method and means by which the stored energy can be retained in these batteries for a comparatively great period of time; just how long I do not know; but thus far the battery to which I have applied my invention has not lost any of its stored energy, although it is now upward of a month since it was charged.

In all secondary batteries of which I have any knowledge, in which the positive electrode is made of metal, the electric energy is stored by combining the oxygen of the electrolytic liquid with the positive electrode and absorbing the hydrogen with or into the negative electrode. Now, the oxygen, uniting chemically with the metal of the electrode, is retained; but the hydrogen, being merely absorbed into the material of the negative pole, is gradually given up, and the electric energy of the battery lost. To prevent this I seal the negative electrode, the positive pole being made of metal, either in or out of the electrolytic fluid, so as to prevent the access of the atmosphere to it, and all electrical or chemical action between the two electrodes. By this means the hydrogen is retained and the energy of the battery remains intact. In case the positive pole be made of an absorbing material, so as to hold the oxygen merely by absorption, that also should be sealed, either in or out of the fluid, sufficiently to prevent the air from circulating in contact with the electrode. The electrodes need not be sealed *in vacuo*. The air inclosed upon them by the sealing does no harm. It is continual contact or circulation of the air, and the chemical or electrical action between the electrodes, that dissipates the hydrogen element and destroys the battery.

In the drawings, A is a porous cup set in a jar, B, containing the electrolytic fluid.

C is a negative electrode composed of powdered charcoal mixed with powdered graphite, in the center of which a silver rod, D, is inserted to carry the current into and through the electrode. H is an inverted sealing-cup sustained upon the silver rod.

E is a positive electrode composed of lead in the form of thread or fiber.

I and J are connecting-wires, and G a windlass by which one or both of the electrodes are raised and suspended out of the fluid, which in this case is shown by the broken lines in the chamber B. In this arrangement the sealing-cup H is a fixture, remaining substantially in the position shown during the charging and operation of the battery. The cup in this case acts like a trap and excludes the circulation of the air from the electrode and prevents the escape of the hydrogen, and greatly lessens the loss of electric energy. The cup may of course be extended to the bottom of the electrode, the more effectually to seal it and prevent any chemical or electrical action between the electrodes; but in that case the cup should be raised up during the charging and operation of the battery, as shown by Fig. 3. The shaft G is fitted with clutches and couplings in the manner shown, so that either one or both of the electrodes may be raised out of the fluid. The drawings show the positive electrode E drawn up out of the jar; but that is not material to the effectual sealing of the battery. The electrode is merely drawn up to show the operation of the apparatus, and to illustrate another feature of my invention, which is this: I find that after the battery has been charged and sealed and the positive electrode drawn up out of the fluid, as shown, I can at any time lower electrode into the fluid to any given distance, and obtain just the required amount of energy in the circuit, the amount of energy developed corresponding to the distance the electrode is let down into the fluid. I find, also, that by taking one or both of the electrodes out of the electrolytic fluid, and by sealing the hydrogen electrode, the battery will be effectually sealed and the dissipation of electric energy prevented. Thus, if the positive electrode be made of metal and raised up out of the fluid, as shown by the drawings, so as to break entirely the chemical and electrical relation between the two electrodes, and the hydrogen pole then sealed, the dissipation of electric energy will be greatly lessened, and a similar result may be obtained by interposing a tight partition between the electrodes while in the liquid; but I prefer to separate the electrodes by taking one of them out of the fluid and sealing the negative or hydrogen pole, as described above. The drawings illustrate the negative or hydrogen electrode sealed into the fluid; but it may be sealed quite as effectually out of the fluid. Thus let the electrode be made of the desired size and shape and duly charged. Then let it be taken out of the liquid and sealed in any suitable case or envelope sufficiently tight to exclude from it the circulation of the air, and the electric energy of the electrode will remain intact, or practically so, and the principle holds good, be the electrode made of any of the metals or materials thus far used in the organization or construction of storage-batteries.

The sealing envelope or case may be made of any suitable material. Simply wrapping the electrode in wax-paper makes a very good sealing; but a neater and more effectual sealing is shown by Fig. 2 of the drawings, in which the electrode is shown by A' and the sealing-cup by B', the latter being made of paper covered with paraffine, the sealing around the conductor and the top of the box being perfected by gaskets of india-rubber. It will of course be understood that this method of sealing and raising the electrode out of the fluids is to extend to both electrodes when the construction of the battery is such as to render it necessary.

This invention, it will be seen, offers great advantages in the use of storage-batteries, as by it their energy can be retained indefinitely, and can be used in such proportions and quantities as may be desired at any time; and, moreover, the electrodes can be taken out of the battery, when exhausted, to a general charging-station, charged, sealed up, and taken back to the battery to which they belong and used whenever they may be needed.

I am aware that it is quite common in making storage-batteries to put them into a case comparatively tight; but this does not prevent the loss of energy, nor is it for that purpose, but merely for safety and convenience in handling, and has no bearing whatever upon the subject of my invention.

I am also aware that it is quite common to connect the plates of a galvanic battery to a hoisting apparatus for the purpose of raising and lowering them in and out of the electrolytic fluid to prevent the wasting of the plates; but neither this combination nor the method or purpose embodied by it is embraced or included in my invention or claims. The plates of a galvanic battery are not the equivalents or mere substitutes of the electrodes of a storage-battery; neither is the combination in which the galvanic plates of a primary battery make elements the equivalents of a combination in which the electrodes of a storage-battery make elements. The two are totally different things, used for different purposes, producing totally different results. My invention is confined to certain improvements in the storage-battery by which the electric energy is not only stored, but is protected from loss.

I do not herein broadly claim a method of charging storage-batteries and retaining and utilizing the charge thereof; nor do I herein claim other features shown and described in this specification, but not specifically claimed, as I prefer to make them the subject of another application, the features of novelty being designated in the following claims:

1. The method substantially herein described of charging storage-batteries and retaining the charge, which method consists of first charging the electrodes of a storage-battery with any suitable charging apparatus, and of then preventing the escape of the absorbed hydrogen from the negative electrode by sealing it with any suitable sealing material or device without disturbing the relations of the electrodes, the sealing being applied to prevent the escape of the absorbed gas in contradistinction to the function of accumulating it, as in the ordinary gas-battery.

2. In combination with the negative electrode of a storage-battery, a sealing device adapted to prevent the escape of the gas absorbed by the electrode in the operation of charging, and adapted also to seal the whole or any part of said electrode, by which more or less of said electrode may be unsealed and exposed to the electrolytic fluid, substantially as described.

3. The method substantially herein described of charging storage-batteries and retaining and utilizing the charge, which method consists of first charging the electrodes of a storage-battery with any suitable charging apparatus, of then sealing one or both of them, and of then exposing the whole or any part of said electrodes in the circuit of the battery, substantially as described.

4. In a storage-battery, the combination of a sealing-cup, H, with the negative electrode C, having a conductor, D, and inclosed in a chamber, A, the whole being contained within a jar, B, supplied with an electrolytic fluid, substantially as described.

5. In a storage-battery, the combination of a positive electrode, E, with a negative electrode, C, and a sealing cup or case, H, one electrode being adapted to be sealed by the cup or case and to be lifted out of the fluid, by which the dissipation of the charge is prevented by sealing one pole and by disrupting the electric connection between the two poles, substantially as described.

6. The method substantially herein described of charging and utilizing the charge of storage-batteries, which method consists of first charging the electrodes of a storage-battery with any suitable charging apparatus, and of then exposing more or less of such charged electrodes to the electrolytic fluid, as may be necessary to supply the desired current, substantially as described.

CORNELIUS T. TOMKINS.

Witnesses:
WM. H. BROADNAX,
J. EDGAR BULL.